(12) United States Patent
Adya et al.

(10) Patent No.: US 9,219,673 B2
(45) Date of Patent: *Dec. 22, 2015

(54) CRISSCROSS CANCELLATION PROTOCOL

(71) Applicant: MICROSOFT TECHNOLOGY LICENSING, LLC, Redmond, WA (US)

(72) Inventors: Atul Adya, Redmond, WA (US); Alastair Wolman, Seattle, WA (US); John D Dunagan, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/690,350

(22) Filed: Apr. 17, 2015

(65) Prior Publication Data

US 2015/0222518 A1 Aug. 6, 2015

Related U.S. Application Data

(63) Continuation of application No. 13/684,156, filed on Nov. 22, 2012, now Pat. No. 9,015,349, which is a continuation of application No. 12/824,092, filed on Jun. 25, 2010, now Pat. No. 8,327,030, which is a continuation of application No. 11/858,140, filed on Sep. 20, 2007, now Pat. No. 7,774,490.

(51) Int. Cl.
*H04L 29/06* (2006.01)
*H04L 12/26* (2006.01)
*H04L 29/08* (2006.01)

(52) U.S. Cl.
CPC ............ *H04L 43/10* (2013.01); *H04L 65/1003* (2013.01); *H04L 67/14* (2013.01); *H04L 67/142* (2013.01)

(58) Field of Classification Search
CPC .......................... H04L 65/1003; H04L 67/14
See application file for complete search history.

(56) References Cited

U.S. PATENT DOCUMENTS 4,823,122 A 4/1989 Mann
5,258,908 A 11/1993 Hartheimer et al.
(Continued)

FOREIGN PATENT DOCUMENTS

JP 2005-346448 12/2005
JP 2006-042156 2/2006
(Continued)

OTHER PUBLICATIONS

CN Notice on the Second Office Action for Application No. 200880108181.2, Sep. 21, 2012.
(Continued)

*Primary Examiner* — Jimmy H Tran
(74) *Attorney, Agent, or Firm* — Judy Yee; Bryan Webster; Micky Minhas

(57) ABSTRACT

Technologies, systems, and methods for ordered message delivery that avoid message races or crisscrosses between communicating nodes. For example, if Node A sends message 3 towards Node B and, shortly thereafter, Node B sends message X to Node A, Node A would like to know whether or not message X reflects Node B's state after receiving message 3. If Node B received message 3 prior to sending message X, then proper state may be maintained between the nodes. But if messages 3 and X crisscrossed, or if message 3 was never properly received by Node B, then the state between the nodes may be corrupt. Technologies, systems, and methods are provided to avoid such corruption.

20 Claims, 9 Drawing Sheets

(56) References Cited

U.S. PATENT DOCUMENTS

| | | | |
|---|---|---|---|
| 5,260,933 A | 11/1993 | Rouse | |
| 5,495,475 A | 2/1996 | Franaszek | |
| 5,754,764 A | 5/1998 | Davis | |
| 5,901,291 A | 5/1999 | Feeney et al. | |
| 5,951,706 A | 9/1999 | Benner | |
| 5,999,286 A | 12/1999 | Venkatesan | |
| 6,078,970 A | 6/2000 | Nordstrom et al. | |
| 6,188,675 B1 | 2/2001 | Casper et al. | |
| 6,412,006 B2 | 6/2002 | Naudus | |
| 6,735,645 B1 | 5/2004 | Weber | |
| 6,768,720 B1 | 7/2004 | Kamstra | |
| 6,892,290 B2 | 5/2005 | Van Doran | |
| 6,895,476 B2 | 5/2005 | Tierney | |
| 7,017,129 B2 | 3/2006 | Ouyang | |
| 7,039,851 B2 | 5/2006 | Wang et al. | |
| 7,065,549 B2 | 6/2006 | Sun et al. | |
| 7,085,814 B1 | 8/2006 | Gandhi et al. | |
| 7,240,097 B2 | 7/2007 | Holdsworth et al. | |
| 7,254,687 B1 | 8/2007 | Jeter, Jr. et al. | |
| 7,343,454 B2 | 3/2008 | Shen | |
| 7,383,440 B1 | 6/2008 | Miller, III et al. | |
| 7,526,634 B1 | 4/2009 | Duluk, Jr. et al. | |
| 7,543,079 B1 | 6/2009 | Ho | |
| 7,673,181 B1 | 3/2010 | Lindo et al. | |
| 7,774,490 B2 | 8/2010 | Adya | |
| 7,823,013 B1 | 10/2010 | O'Krafka et al. | |
| 7,844,862 B1 | 11/2010 | Grove | |
| 7,861,118 B2 | 12/2010 | Edwards et al. | |
| 2002/0016837 A1 | 2/2002 | Naudus | |
| 2002/0124143 A1 | 9/2002 | Barroso et al. | |
| 2002/0178247 A1 | 11/2002 | Shaheen | |
| 2003/0041265 A1 | 2/2003 | Lagimonier et al. | |
| 2003/0140326 A1 | 7/2003 | Ouyang | |
| 2004/0103282 A1 | 5/2004 | Meier et al. | |
| 2004/0153491 A1 | 8/2004 | Harada | |
| 2004/0205141 A1 | 10/2004 | Goland | |
| 2005/0038806 A1 | 2/2005 | Ma | |
| 2005/0190753 A1 | 9/2005 | Kwon | |
| 2005/0193428 A1 | 9/2005 | Ring et al. | |
| 2005/0198365 A1 | 9/2005 | Wei | |
| 2005/0223089 A1 | 10/2005 | Rhodes | |
| 2005/0283781 A1 | 12/2005 | Karp | |
| 2006/0002292 A1 | 1/2006 | Chang et al. | |
| 2006/0059238 A1 | 3/2006 | Slater et al. | |
| 2006/0106995 A1 | 5/2006 | Shen | |
| 2006/0221720 A1 | 10/2006 | Reuter | |
| 2007/0124398 A1 | 5/2007 | Parkinson et al. | |
| 2007/0130363 A1 | 6/2007 | Barros | |
| 2008/0120627 A1 | 5/2008 | Krauss | |
| 2008/0195866 A1 | 8/2008 | Roth et al. | |
| 2008/0244332 A1 | 10/2008 | Edwards | |
| 2010/0287299 A1 | 11/2010 | Adya | |
| 2010/0287300 A1 | 11/2010 | Adya | |

FOREIGN PATENT DOCUMENTS

| | | |
|---|---|---|
| WO | 01-63839 A2 | 8/2001 |
| WO | 2006111182 A1 | 10/2006 |

OTHER PUBLICATIONS

Yu, Yuan, Tom Rodeheffer, and Wei Chen. "Racetrack: efficient detection of data race conditions via adaptive tracking." ACM SIGOPS Operating Systems Review. vol. 39. No. 5. ACM, 2005.

JP Notice of Rejection, Application No. 2010-525864, Apr. 23, 2012.

Netzer, "What are Race Conditions? Some issues and Formalizations", ACM, Mar. 1992.

CN First Office Action, Application No. 200880108181.2, Apr. 18, 2012.

International Search Report for PCT/US2008/072467 mailed Feb. 26, 2009. 12 Pages.

Lei, "Reachability Analysis and Testing of Asynchronous Message-Passing Programs", 2002, pp. 106.

Netzer et al., "Debugging Race Conditions in Message-Passing Programs", ACM Press. 1996. pp. 31-40.

Vuduc et al., "Improving Distributed Memory Applications Testing by Message Perturbation", ACM Press, Jul. 17, 2006, Association for Computing Machinery, 2005, pp. 31-40.

CRISSCROSS CANCELLATION PROTOCOL

RELATED APPLICATIONS

This Application is a Continuation of U.S. patent application Ser. No. 13/684,156 that was filed on Nov. 22, 2012, and that is a Continuation of U.S. patent application Ser. No. 12/824,092 (U.S. Pat. No. 8,327,030) that was filed on Jun. 25, 2010 (Issued Dec. 4, 2012) and that is a Continuation of U.S. patent application Ser. No. 11/858,140 (U.S. Pat. No. 7,774,490) that was filed on Sep. 20, 2007 (Issued Aug. 10, 2010) each of which is incorporated herein by reference in its entirety.

BACKGROUND

Distributed systems, such as networked computers, may need to know each other's state during communications. This typically requires that two systems communicate sequentially rather than simultaneously. If both systems send messages to each other simultaneously (or non-sequentially) resulting in crisscrossed messages, a race condition can develop which can lead to divergent and corrupted state information.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for ordered message delivery that avoid message races or crisscrosses between communicating nodes. For example, if Node A sends message 3 towards Node B and, shortly thereafter, Node B sends message X to Node A, Node A would like to know whether or not message X reflects Node B's state after receiving message 3. If Node B received message 3 prior to sending message X, then proper state may be maintained between the nodes. But if messages 3 and X crisscrossed, or if message 3 was never properly received by Node B, then the state between the nodes may be corrupt. Technologies, systems, and methods are provided to avoid such corruption.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and networking environment, the environment described is provided as an example and not a limitation. As those skilled in the art will appreciate, the present examples are suitable for application in a variety of different types of computing and networking environments.

Figure 1:
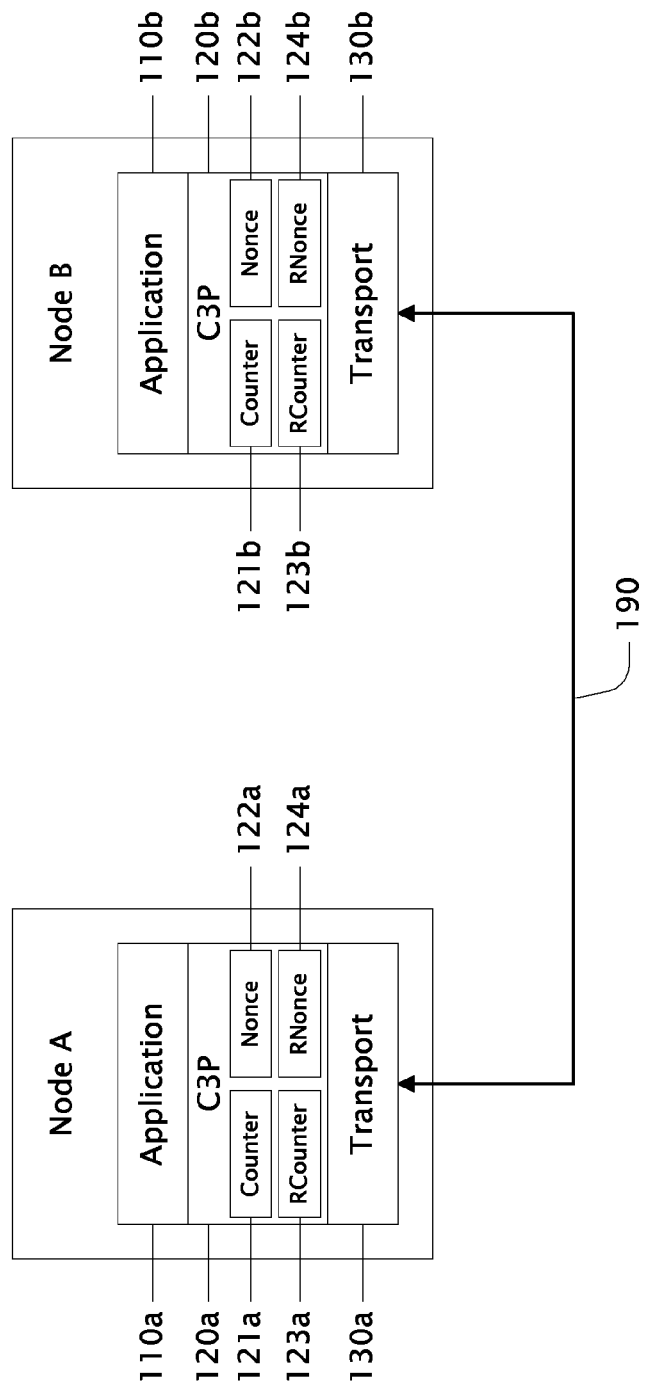
FIG. 1 is a block diagram showing two example crisscross cancellation protocol-enabled nodes that are communicatively coupled.

FIG. 1 is a block diagram showing two example crisscross cancellation protocol-enabled nodes that are communicatively coupled. Node A and Node B are coupled as indicated by line 190, which may be any type of coupling, connection, communications link, network, or the like. Each node includes an example application, such as applications 110a and 110b, which may be any program, system, device, software, device driver, firmware, or the like that may benefit from a crisscross cancellation protocol. Applications 110a and 110b may or may not be the same. Applications 110a and 110b typically send and receive messages via a crisscross cancellation protocol ("C3P") layer, such as C3Ps 120a and 120b. The crisscross cancellation protocol maintains appropriate state information via state variables such as variables 121a-124a. A crisscross cancellation protocol typically makes use of a transport, such as transports 130a and 130b, to send and receive C3P messages over some form of communications link.

The state fields or variables typically maintain the state of the C3P. Each C3P module or instance of the C3P includes: a counter, such as counter state variables 121a and 121b; a nonce, such as nonce state variables 122a and 122b; a remote counter, such as remote counter state variables 123a and 123b; and a remote nonce, such as remote nonce state variables 124a and 124b. In one example, each of these state variables is a 64-bit number.

The nonce state variable (i.e., 122a) typically uniquely identifies the current C3P session. A C3P session is typically established when a C3P layer is initialized. A new instance of the C3P layer is typically established each time a C3P-enabled node needs to communicate with a new C3P-enabled node (for example, one that it has not previously communicated with). Generally, each time a C3P layer is initialized a new nonce is generated.

The remote nonce state variable (i.e., 124a) is typically used to record the nonce of a remote node (that is, the remote node's C3P layer) as indicated by the header of the last valid C3P message received from the remote node.

The term "nonce" as used herein refers to a cryptographic random nonce, a counter or random or pseudo-random number that is unlikely to be reused. Such a nonce is generally used by C3P to identify each session uniquely from any other session. Thus, in the event of a node crash or the like, the next time the C3P is initialized a new and unique nonce is established indicating a new and unique C3P session.

The counter state variable (i.e., 121a) is typically a monotonicaMy increasing variable that increments by one for each message sent, or a value identifying the last message sent. In one example, the counter is incremented each time a message is sent.

The remote counter state variable (i.e., 123a) is typically used to record the counter of a remote node (that is, the remote node's C3P layer) as indicated by the header of the last valid C3P message received from the remote node.

In general, an application passes a message to be sent to another node down to the C3P layer, the C3P layer typically adds a C3P header (as described in connection with FIG. 1), buffers the message in a send buffer, and passes the message to the transport which sends the message over the network to the target node. Each C3P layer typically buffers a single outgoing message in a send buffer.

Upon receiving a valid C3P message, the message is stored in a C3P receive buffer after the target node's transport passes the C3P message up to the C3P layer. In one example, the receive buffer stores one or more incoming messages. The C3P layer verifies the messages are valid, removes the C3P header, and passes the message up to a corresponding application. In one example, once the application is done processing the received message, it instructs the C3P layer to empty this message from the receive buffer. In this example, the C3P layer will not send a message until the receive buffer is empty, as doing so would be equivalent to a message crisscross, with the application sending a new message without having processed a previously received message.

The two communicating C3P layers intemperate to provide ordered message delivery for the applications and to avoid message races or crisscrosses. The term "message race" or "message crisscross" or "crisscross" as used herein refers to the situation when a first node sends a message to a second node and, before the second node receives the message from the first node, the second node sends a message to the first, node. Such a situation results in a message crisscross or message race condition. This situation is described in more detail in connection with FIG. 8.

As used herein, the term "node" refers to any computer system, device, or process that is uniquely addressable, or otherwise uniquely identifiable, over a network or the like, and that is operable to communicate with other nodes over the network. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, a uniquely-identifiable software application, or the like. One example of a node such as Node A and Node B, in the form of computer system 900, is set forth herein below with respect to FIG. 9.

Figure 2:
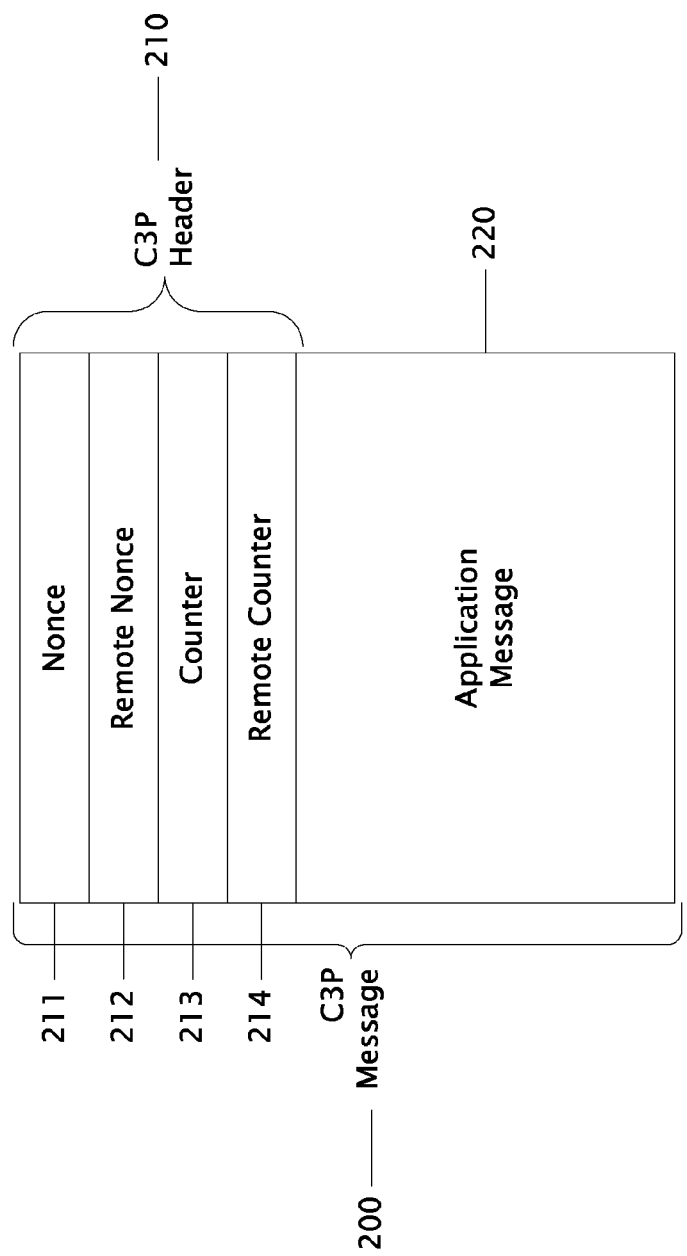
FIG. 2 is a block diagram showing an example crisscross cancelation protocol ("C3P") message including an example C3P header.

FIG. 2 is a block diagram showing an example crisscross cancelation protocol ("C3P") message 200 including an example C3P header 210. The C3P message 200 is typically comprised of an application message (a message, packet, data, or the like provided by an application) in the message field 220 and a C3P header 210. In one example, C3P header 210 includes state information in four fields: nonce 211, remote nonce 212, counter 213, and remote counter 214. In this example, the state values are 64-bit numbers. Nonce 211 and counter 213 values are typically taken from the sending C3P's corresponding state variables each time a message is sent. Remote nonce 212 and remote counter 214 values are typically taken from the sending C3P's remote nonce and remote counter state variables, the values of which are typically obtained from the header of the last valid C3P message received from the remote node. A C3P ping message is a version of C3P message 200 that does not include application message 220.

Figure 3:
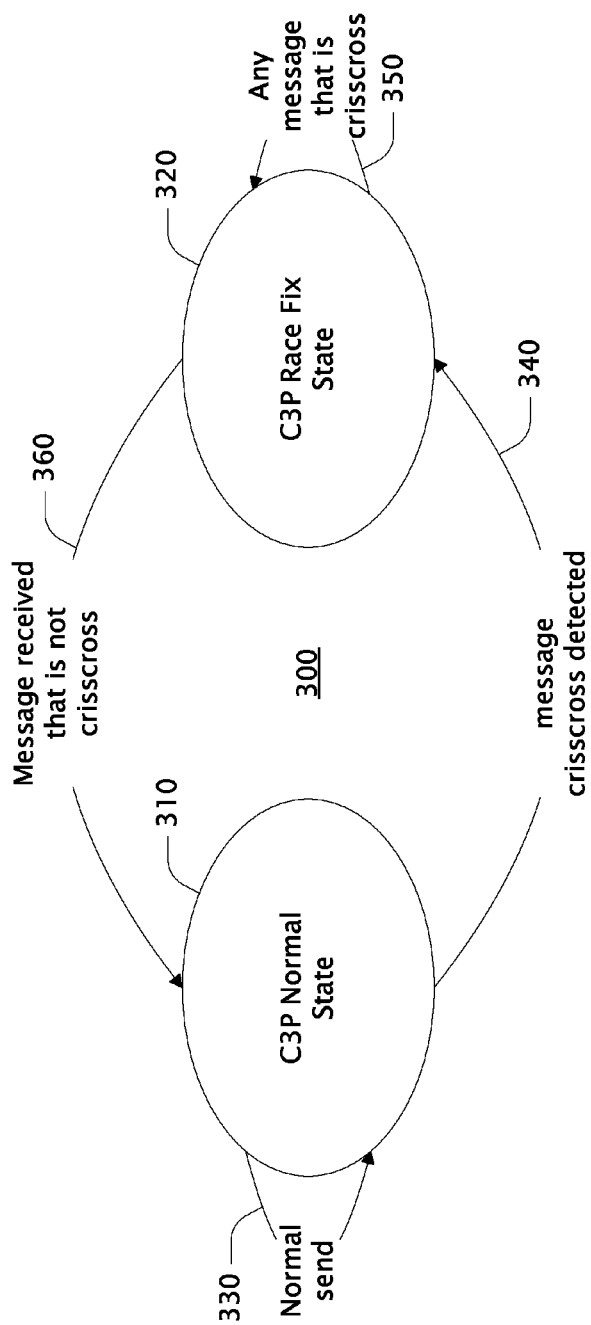
FIG. 3 is a block diagram showing an example crisscross cancellation protocol state diagram.

FIG. 3 is a block diagram showing an example crisscross cancellation protocol state diagram 300. A particular C3P instance generally transitions between two states: C3P normal state 310 and C3P race fix state 320. Once the C3P instance is successfully initialized, it typically enters C3P normal state 310. Each time a normal (non-C3P ping) C3P message is sent, the C3P transitions back into the C3P normal state as indicated by arrow 330. The C3P remains in the C3P normal state 330 until a C3P message crisscross is detected. If a C3P message crisscross is detected (as described in connection with FIG. 5), the C3P transitions into the C3P race fix state 320 as indicated by arrow 340. The C3P remains in the C3P race fix state 320 until a C3P message is received that is not a message crisscross. Each time any C3P message is received that has crisscrossed with another message, the C3P transitions back into the C3P race fix state 320 as indicated by arrow 350. When an in-order C3P message (either a C3P ping or a C3P message that does include an application message) is received or other appropriate conditions are met as described in connection with FIG. 7, the C3P transitions into the C3P normal state 310 as indicated by arrow 360.

Figure 4:
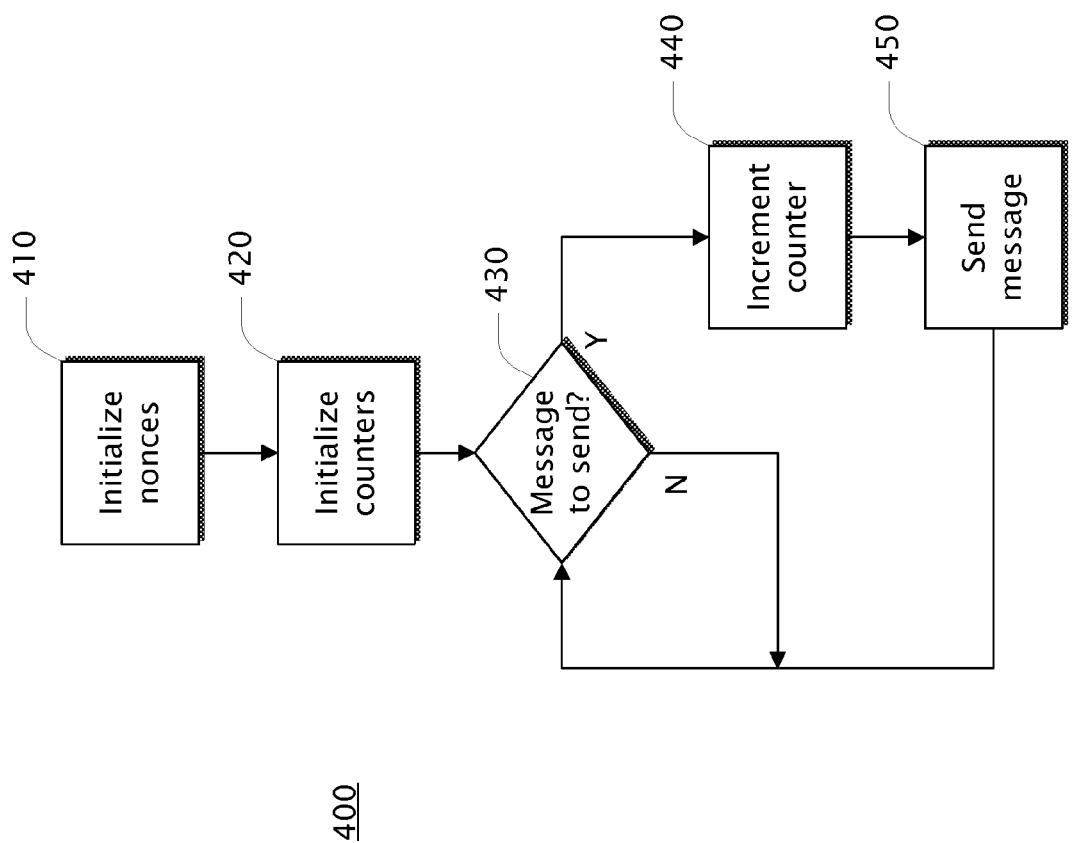
FIG. 4 is a block diagram showing an example method for initializing a crisscross cancellation protocol instance and for sending a message.

FIG. 4 is a block diagram showing an example method 400 for initializing a crisscross cancellation protocol instance and for sending a message. C3P initialization includes the steps indicated by blocks 410 and 420. Each time a hosting node starts a C3P instance the initialization steps are performed. This generally includes each time the node starts a new C3P instance to communicate with a particular new remote node, and each time the node restarts during a C3P session, such as a reboot or a crash restart.

Block 410 indicates initializing the C3P's nonce state variable, as described in connection with FIG. 1. This is typically done by generating a new nonce value, in one example, a nonce is generated as a random number which is typically different than a previous nonce. Once the nonce state variable is initialized, method 400 typically continues at block 420.

Block 420 indicates initializing the C3P's counter state variable, as described in connection with FIG. 1. This is typically done by generating a new counter value. In one example, the counter is initialized to zero (0). Once the counter state variable is initialized, C3P initialization is typically complete and method 400 typically continues at block 430.

Block 430 typically indicates waiting for an application message to send. Once the C3P is initialized, it waits for a message to be sent. Messages are typically provided by an application or the like. Once a message is available to be sent, method 400 typically continues at block 440.

Block 440 typically indicates incrementing the counter state variable, as described in connection with FIG. 1. The counter state variable may be incremented by one or more. Once the counter state variable has been incremented, method 400 typically continues at block 450.

Block 450 typically indicates formatting and sending a C3P message. Formatting is typically performed by adding a C3P header to the message provided by the application (see description for block 430). The C3P header and message are typically constructed as described in connection with FIG. 2. In one example, the C3P message is sent by providing it to a transport as described in connection with FIG. 1. Once the message is sent, method 400 typically continues at block 430.

Figure 5:
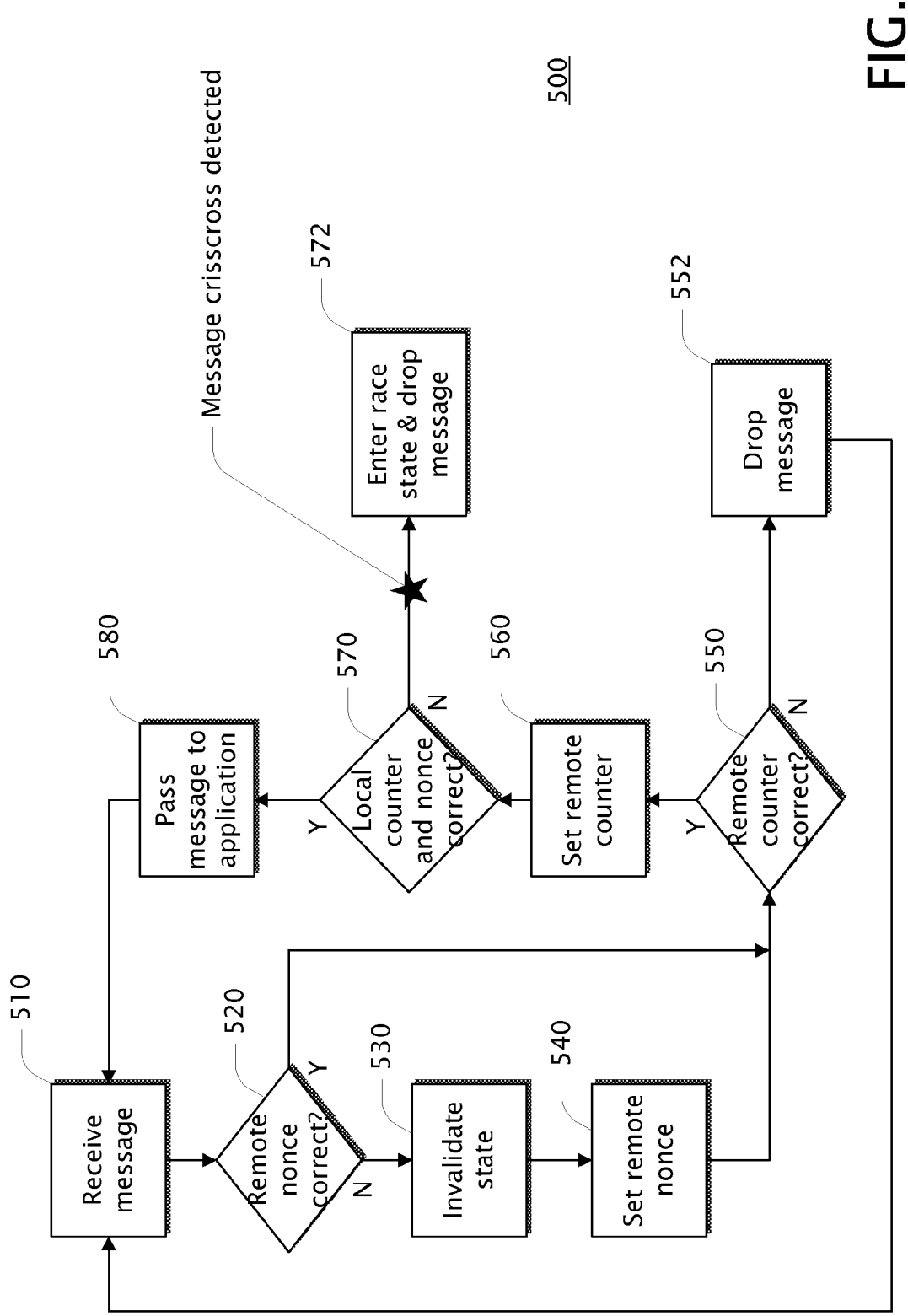
FIG. 5 is a block diagram showing an example method for processing a crisscross cancellation protocol message and detecting a message crisscross.

FIG. 5 is a block diagram showing an example method 500 for processing a crisscross cancellation protocol message and detecting a message crisscross. Method 500 is typically performed by a C3P instance receiving a C3P message while in the C3P normal state as described in connection with FIG. 3. In general, method 500 compares state information in the incoming message's header with state information stored in the C3P instance receiving the message, as described in connection with FIG. 1.

Block 510 typically indicates receiving a C3P message. Such a message typically includes a C3P header including state information as described in connection with FIG. 2. Once a message is received, method 500 typically continues at block 520.

Block 520 typically indicates determining if the nonce value of the incoming message's header is correct, in one example, the value in the nonce field of the incoming message's header (i.e., item 211, FIG. 2) is compared with the value stored in the remote nonce field of the receiving C3P instance's state information (i.e., item 124a, FIG. 1). If the two values do not match (e.g., are not equal), then the receiving C3P instance assumes that the sending C3P instance has crashed since the last message received. If the two values do not match, method 500 typically continues at block 530. Otherwise, method 500 typically continues at block 550.

Block 530 typically indicates invalidating the receiving C3P instance's state information. In one example this is done by setting each of the remote state values (i.e., items 123a-124a, FIG. 1) to zero (0). Once the state information has been invalidated, the application is typically made aware that the remote C3P instance has experienced a crash, and then method 500 typically continues at block 540.

Block 540 typically indicates setting the receiving C3P instance's remote nonce field (i.e., item 124a, FIG. 1) to the value in the nonce field of the incoming message (i.e., item 211, FIG. 2). Once the remote nonce state value is set, method 500 continues at block 550.

Block 550 typically indicates determining if the counter value of the incoming message's header is correct. In one example, the value in the counter field of the incoming message's header (i.e., item 213, FIG. 2) is strictly greater than the value stored in the remote counter field of the receiving C3P instance's state information (i.e., item 123a, FIG. 1). If the incoming counter is not greater, then the receiving C3P instance assumes that it has already received the incoming message or a later message. If the incoming counter is not greater, then method 500 typically continues at, block 552. Otherwise, method 500 typically continues at block 560.

Block 552 typically indicates dropping the incoming message because it was either already received or because a later message was already received (see block 550). Once the incoming message is dropped, method 500 typically continues at block 510.

Block 560 typically indicates setting the receiving C3P instance's remote counter field (i.e., item 123a, FIG. 1) to the value in the counter field of the incoming message (i.e., item 213, FIG. 2). Once the remote counter state value is set, method 500 continues at block 570.

Block 570 typically indicates determining if the remote counter value and remote nonce value of the incoming message's header are correct. In one example, the value in the remote counter field of the incoming message's header (i.e., item 214, FIG. 2) matches (e.g., is equal to) the value stored in the counter field of the receiving C3P instance's state information (i.e., item 121a, FIG. 1) and the value in the remote nonce field of the incoming message's header (i.e., item 212, FIG. 2) is either zero or matches (e.g., is equal to) the value stored in the nonce field of the receiving C3P instance's state information (i.e., item 122a, FIG. 1). If the incoming remote counter does not match, or if the incoming remote nonce is neither zero nor matching, then the receiving C3P instance assumes that one or more messages have crisscrossed. If the incoming remote counter is not matching, or if the incoming remote nonce is neither zero nor matching, then method 500 typically continues at block 572. Otherwise, method 500 typically continues at block 580.

Block 572 typically indicates the receiving C3P instance entering the C3P race fix state as described in connection with FIG. 3. Entering the C3P race fix state typically includes dropping the incoming message. Processing while in the C3P race fix state proceeds as described in connection with FIG. 7.

Block 580 typically describes passing the incoming message up to a receiving application. At this point the incoming message is determined to be valid, in one example, the C3P header is stripped from the message before it is passed up. Once the message is passed, method 500 typically continues at block 510.

Figure 6:
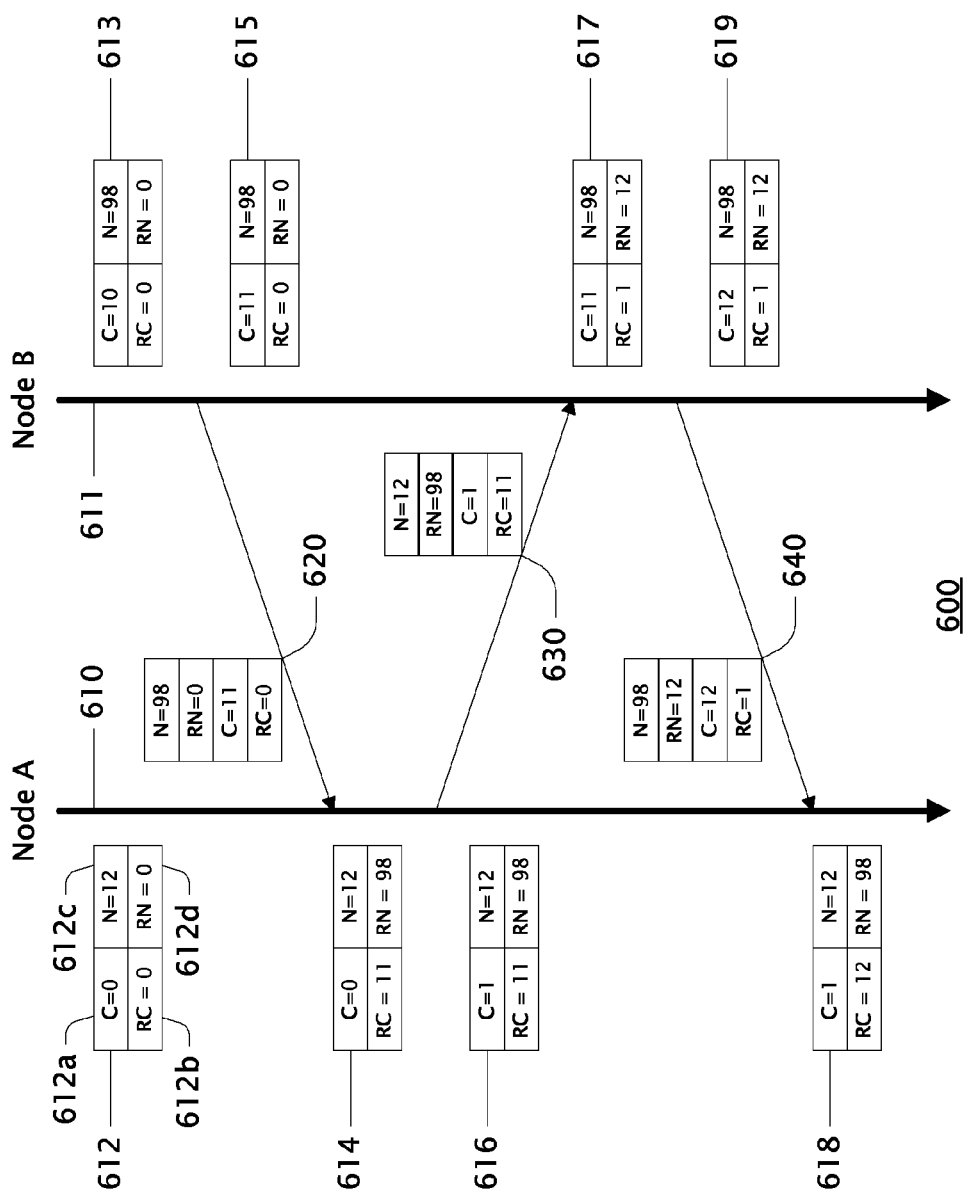
FIG. 6 is a timing diagram showing an example of ordered message transmissions between two example nodes.

FIG. 6 is a timing diagram 600 showing an example of ordered message transmissions between two example nodes. Arrow 610 is a timeline for Node A and arrow 611 is a corresponding timeline for Node B. State block 612 shows the example initial state of Node A and state block 613 shows the example initial state of Node B at the beginning of the timelines. State blocks 612, 613, and the like, and their included fields, correspond to those described in connection with FIG. 1. In particular, field 612a corresponds to field 121a of FIG. 1; field 612b corresponds to field 123a of FIG. 1; field 6112c corresponds to field 122a of FIG. 1; and field 612d corresponds to field 124a of FIG. 1. The values for the various state fields are examples only and may be any appropriate values in practice. Each node is typically initialized to the C3P normal state as described in connection with FIG. 3 and typically operates according to method 500 described in connection with FIG. 5. In one example, the state fields support 64-bit values and may be initialized as shown in Table A and Table B herein below:

TABLE A

| Node A Initial State: | |
|---|---|
| Nonce | 0 × 1234567812345678 |
| Counter | 0 |
| Remote Nonce | 0 × 0 |
| Remote Counter | 0 |

TABLE B

| Node B initial State: | |
|---|---|
| Nonce | 0 × 8765432187654321 |
| Counter | 0 |
| Remote Nonce | 0 × 0 |
| Remote Counter | 0 |

As shown in tables A and B, examples of the initial states of Nodes A and B, each node knows its own nonce, but not the other node's nonce (as indicated by the initial value of zero shown in hexadecimal (0×0) in the Remote Nonce fields). Further, in their initial states, each node knows its own counter (which may be initialized to zero as shown), but not the other node's counter (as indicated by the initial value of zero (0) in the remote counter fields). Nonce fields may be initialized with random values. In other examples, initial values other than zero may be used and/or initial values of the other node may be known.

Timing diagram 600 shows Node B sending a first message to Node A, as indicated by arrow and message header 620. The message header includes the nonce value of Node B (N=98), the nonce of node A (RN=0, currently unknown by Node B), the incremented counter value of Node B (C=11, incremented from C=10 of state 613 prior to sending message 620), and the counter value of Node A (RC=0, currently unknown by Node B). State block 615 indicates the state of Node B after sending message 620.

Upon receiving message 620, Node A updates its state with the information from the header of message 620, as indicated by state block 614. At this point, Node A knows the nonce of Node B (RN=98) and the message counter of Node B (RC=11), and state 614 is updated to indicate such. Node A may know message 620 is a first message from Node B because Node A's state information for Node B (remote nonce and remote counter) was set to the initial state (zero) when message 620 was received.

Per timing diagram 600, Node A now sends a message to Node B, as indicated by arrow and message header 630. The message header includes the nonce value of Node A (N=12), the incremented counter value of Node A (C−1, incremented from C=0 of state 612 prior to sending message 630), the nonce value of node B (RN=98, known by Node A via message 620), and the counter value of Node B (R=11, known by Node A via message 620). State block 616 indicates the state of Node A after sending message 630.

Upon receiving message 630, Node B updates its state with the information from the header of message 630, as indicated by state block 617. At this point, Node B knows the nonce of Node A (RN=12) and the message counter of Node A (RC=1), and state 617 is updated to indicate such. Node B may know message 630 is a first message from Node A because Node B's state information for Node A (remote nonce and remote counter) was set to the initial state (zero) when message 630 was received.

Per timing diagram 600, Node B now sends a second message to Node A, as indicated by arrow and message header 640. The message header includes the nonce value of Node B (N=98), the incremented counter value of Node B (C=12, incremented from C=11 of state 617 prior to sending message 640), the nonce value of Node A (RN=12, known by Node B via message 630) and the counter value of Node A (RC−1, known by Node B via message 630). State block 619 indicates the state of Node B after sending message 640.

Upon receiving message 640, Node A determines that its state values for Node B (remote nonce and remote counter) are not set to the initial values. Therefore, Node A verifies that the nonce value in the message header 640 from Node B (N=98) matches that of its state 616 for Node B (RN=98). If there is a match, then Node A knows that the C3P session of Node B has not reset since the last message received from Node B. Node A further verifies that the counter value in message header 640 from Node B (C=12) is greater than that of its state 616 for Node B (RC=11). If the counter of the incoming message is greater than that of Node A's state for Node B, then Node A knows that message 640, or a later message, has not already been received. Node A further verifies that the remote counter value in message header 640 from Node B (RC=1) matches that of its state 616 for Node A's counter (C=1). If there is a match, then Node A knows that Node B did not send message 640 prior to receiving message 630 from Node A-that is, there was no message crisscross. If the nonce and counter of message 640 are valid and there was no message crisscross, then Node A updates its state with the information from the header of message 640, as indicated by state block 618. Other ordered messages may be sent between Nodes A and B in like manner.

Figure 7:
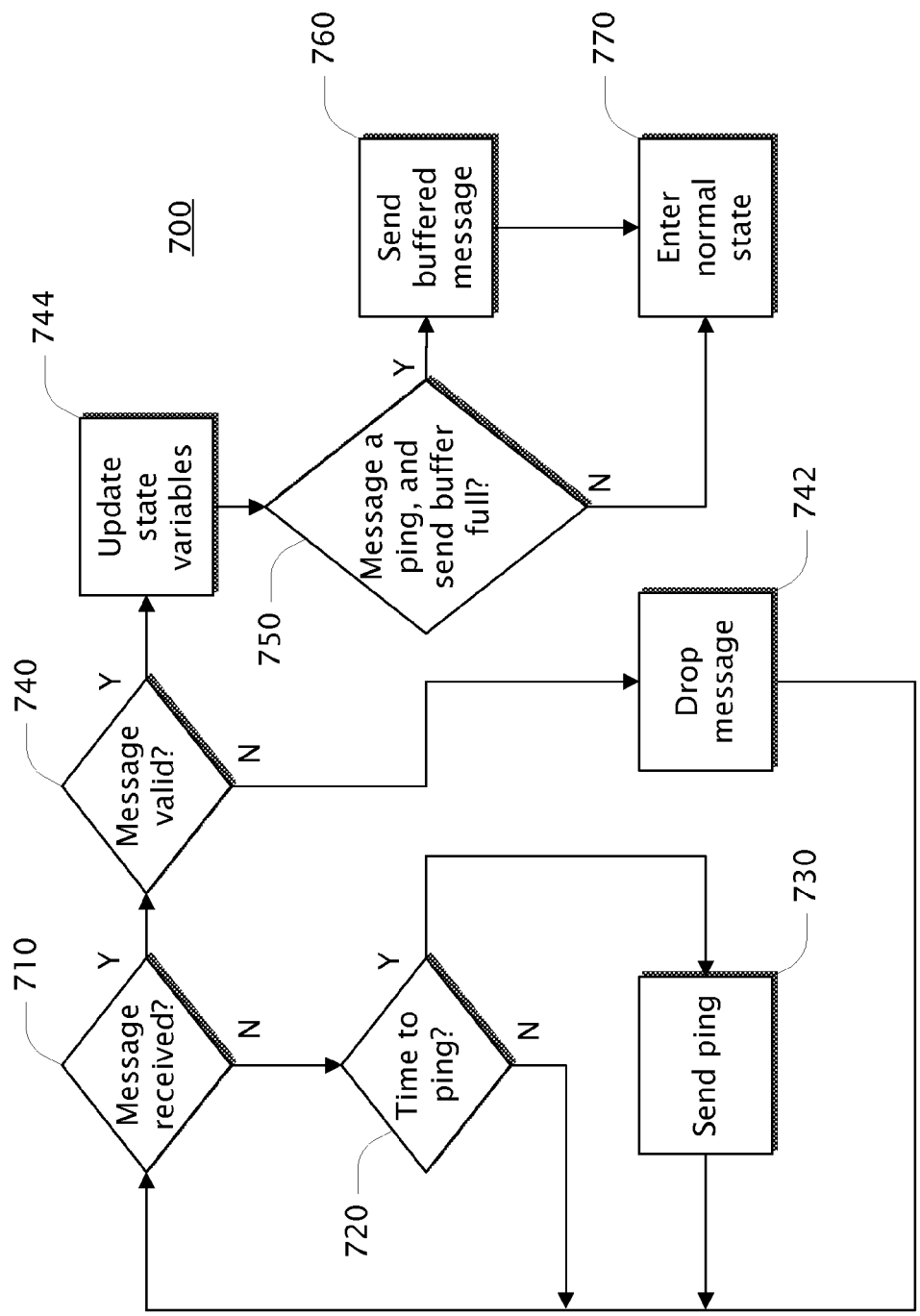
FIG. 7 is a block diagram showing an example method for processing a crisscross cancellation protocol message while in a race fix state.

FIG. 7 is a block diagram showing an example method 700 for processing a crisscross cancellation protocol message while in a race fix state. Method 700 is typically performed by a C3P instance receiving a C3P message while in the C3P race fix state as described in connection with FIG. 3. In general, method 700 compares state information in the incoming message's header with state information stored in the C3P instance receiving the message, as described in connection with FIG. 1.

Block 710 typically indicates the C3P instance receiving an incoming C3P message. Such an incoming message may be a C3P message, as described in connection with FIG. 2, or a C3P ping message, as described in connection with FIGS. 2 and 8. When such a message arrives, it is typically buffered in a single-message receive buffer. When a message arrives, method 700 typically continues at block 740. Until a message arrives, method 700 typically continues at block 720.

Block 720 typically indicates determining if it is time to send a C3P ping message, in one example, ping messages are sent, while in the C3P race fix state at intervals based on a back-off algorithm, such as starting with an interval of 50 milliseconds and doubling the interval with each ping that does not result in a return to the C3P normal state. When it is time to send a ping message, method 700 typically continues at block 730. Otherwise, method 700 typically continues at block 710 waiting for an incoming message.

Block 730 typically indicates sending a C3P ping message. This typically involves constructing the message header based on current state information as described in connection with FIG. 2. Once the ping message has been sent, method 700 typically continues with block 710.

Block 740 typically indicates validating the incoming message, in one example, this is done by checking the message header values against the state variable of the C3P instance as described in connection with blocks 520 through 570 of FIG. 5. If any of the incoming message's header values are incorrect, method 700 typically continues at block 742. Otherwise, method 700 typically continues at block 744.

Block 742 typically indicates dropping the incoming message. Once the incoming message is dropped, method 700 typically continues at block 710.

Block 744 typically indicates updating the C3P instance's state variables based on the incoming message's header values. In one example, this is done by checking the message header values against the state variable of the C3P instance as described in connection with blocks 520 through 570 of FIG. 5. Once the state variables are updated, method 700 typically continues at block 750.

Block 750 typically indicates determining if a buffered message is present in the send buffer and an incoming message is a ping message, if a buffered message is present in the send buffer and the incoming message is a ping message, method 700 typically continues at block 760. Otherwise, method 700 typically continues at block 770.

Block 760 typically indicates sending the message in the send buffer. Generally this message is a non-ping message that may have been previously sent, but being in the race fix state and the receipt of a ping message results in resending the buffered message. Once the buffered message has been sent, method 700 typically continues at block 770.

Block 770 typically indicates the C3P instance transitioning from the C3P race fix state to the C3P normal state. Once in the C3P normal state processing typically continues as described in connection with FIG. 5.

Figure 8:
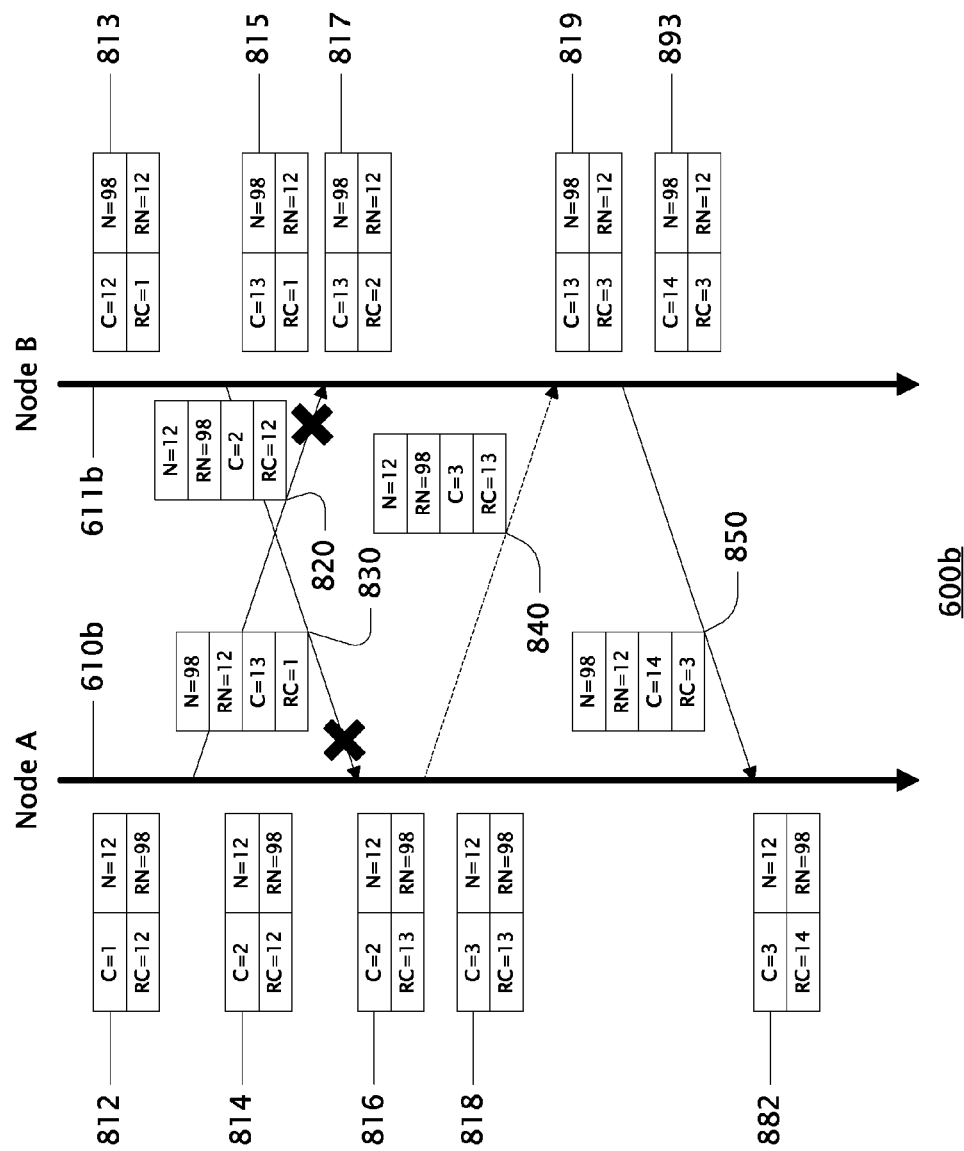
FIG. 8 is a timing diagram, an extension of the timing diagram of FIG. 6, showing an example of a message crisscross and a subsequent recovery.

FIG. 8 is a timing diagram 600b, an extension of timing diagram 600 of FIG. 6, showing an example of a message crisscross and a subsequent recovery. Arrow 610b is a continuation of timeline arrow 610 for Node A and arrow 611b is a continuation of timeline arrow 611 for Node B. State block 812 represents that same point on timeline 610/610b as state block 618 of FIG. 6. State block 813 represents the same point on timeline 611/611b as state block 619 of FIG. 6. The example message crisscross is shown between messages 820 and 830.

Per timing diagram 600b, Node A sends a message to Node B (as indicated by arrow and message header 820) but Node B sends a message to Node A (as indicated by arrow and message header 830) prior to receiving message 820 from Node A. This results in a message crisscross as opposed to ordered messaging.

Upon receiving message 820, Node B detects that the remote counter value in message header 820 from Node A (RC=12) does not match that of its state information 815 for Node B's counter (C=13). In this example, this is because of the crisscross of messages 820 and 830—that is, nodes A and B each sent a message to each other prior to receiving the other's message, resulting in each node's state information becoming unsynchronized with that of the other. Similarly, upon receiving message 830, Node A detects that, the remote counter value in message header 830 from Node B (RC=1) does not match that of its state information 814 for Node A's counter (C=2), a result of the message crisscross. In this example, crisscrossed messages 820 and 830 are typically dropped by the receiving nodes and each node enters the C3P race fix state as described in connection with FIG. 3.

Per timing diagram 600b, Node A then sends a C3P ping message to Node B, as indicated by dashed arrow and message header 840. A C3P ping message is typically a message such as C3P message 200 of FIG. 2 wherein the application message 220 portion is not included. Such a ping message thus includes a message header, such as C3P header 210 of FIG. 2, but no application message. Alternatively or additionally, Node B may send a ping message to Node A as it is also in the C3P race fix state. A ping message generally includes current nonce and counter data thus providing the receiving node with the sending node's latest state information. Each such ping message communicates, "your turn to send," to the receiving node.

Upon receiving ping message 840, Node B compares the incoming message's header information to its state information 817 and verifies that the incoming message's nonce field (N=12) matches its remote nonce state value (RN=12), that the incoming message counter (C=3) is greater than its remote counter state value (RC=2), and that the incoming message's remote counter value (RC=13) matches its counter state value (C=13). Thus Node B verifies that ping message 840 is valid, updates its state information 819 based on the incoming ping message, and transitions from the C3P race fix state to the C3P normal state. Further, Node B re-sends the message in its send buffer, message 830, as indicated by arrow and message header 850.

Upon receiving message 850, Node A compares the incoming message's header information to its state information 818 and verifies the message is valid. Because incoming message 850 is valid, Node A transitions from the C3P race fix state to the C3P normal state. Because message 850 is valid and because it is not a C3P ping message, Node A recognizes that application message 820 must be deleted from the send buffer (only one message from the pair that led to the crisscross may be delivered, and the buffered message on Node A in this example is the one that must not be delivered).

At this point both Node A and Node B have successfully transitioned from the C3P race fix state back to the C3P normal state and ordered message communication can continue.

Alternative methods for exiting the race fix state may also be employed. For example, a node in the C3P race fix state may exit the race fix state after having sent a specified number of ping messages. Such a change may have the negative consequence of delaying the resumption of ordered message communication, but may have the positive consequence of conserving network resources. As a second example, instead of sending the C3P ping messages once a crisscross has been detected, each node may instead send their normal messages with updated counter values. Such a change may have the negative consequence of using significantly more network resources if further message crisscrosses occur (because application messages may be much larger than C3P ping messages), but it may have the positive consequence of avoiding an extra message delay if no further message crisscrosses occur. As a third example, the nonces between a node A and a node B that are communicating may be collapsed into a single nonce by using a handshake analogous to the SYN/SYN-ACK handshake in the Transmission Control Protocol ("TCP"); this may have the positive consequence of reducing the state associated with the C3P layer and the C3P header but may have the negative consequence of requiring additional messages when two nodes first communicate via C3P.

Figure 9:
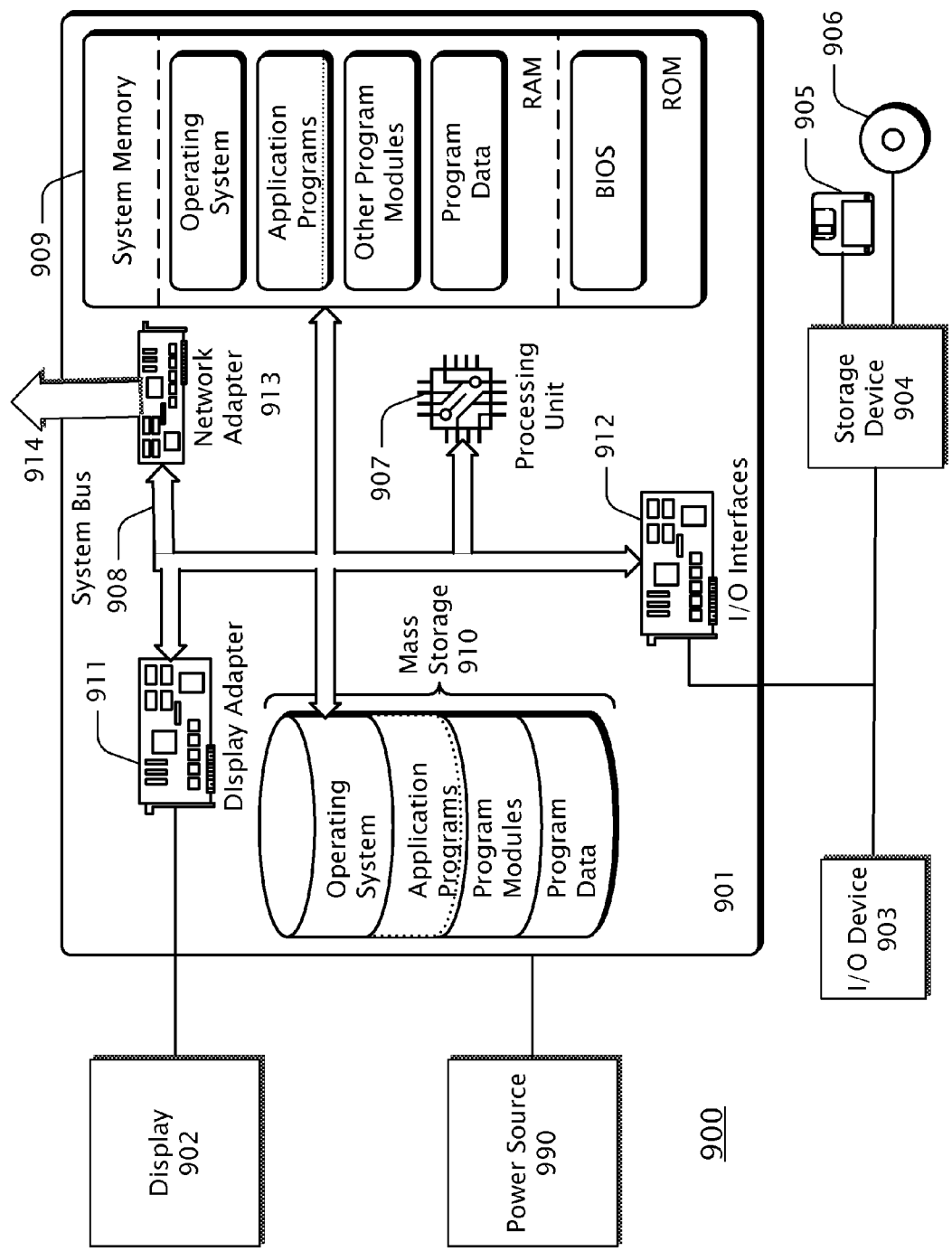
FIG. 9 is a block diagram showing an example computing environment in which the technologies described herein may be implemented.

FIG. 9 is a block diagram showing an example computing environment 900 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 900 typically includes a general-purpose computing system in the form of a computing device 901 coupled to various components, such as peripheral devices 902, 903, 904 and the like. System 900 may couple to various other components, such as input devices 903, including voice recognition, touch pads, buttons, keyboards and/or pointing devices, such as a mouse or trackball, via one or more input/output ("I/O") interfaces 912. The components of computing device 901 may include one or more processors (including central processing units ("CPU"), graphics processing units ("CPU"), microprocessors ("µP"), and the like)

907, system memory 909, and a system bus 908 that typically couples the various components. Processor 907 typically processes or executes various computer-executable instructions to control the operation of computing device 901 and to communicate with other electronic and/or computing devices, systems or environment (not shown) via various communications connections such as a network connection 914 or the like. System bus 908 represents any number of several types of bus structures, including a memory bus or memory controller, a peripheral bus, a serial bus, an accelerated graphics port, a processor or local bus using any of a variety of bus architectures, and the like.

System memory 909 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 909 typically stores data, computer-executable instructions and/or program modules comprising computer-executable instructions that are immediately accessible to and/or presently operated on by one or more of the processors 907.

Mass storage devices 904 and 910 may be coupled to computing device 901 or incorporated into computing device 901 via coupling to the system bus. Such mass storage devices 904 and 910 may include non-volatile RAM, a magnetic disk drive which reads from and/or writes to a removable, non-volatile magnetic disk (e.g., a "floppy disk") 905, and/or an optical disk drive that reads from and/or writes to a non-volatile optical disk such as a CD ROM, DVD ROM 906. Alternatively, a mass storage device, such as hard disk 910, may include non-removable storage medium. Other mass storage devices may include memory cards, memory sticks, tape storage devices, and the like.

Any number of computer programs, files, data structures, and the like may be stored in mass storage 910, other storage devices 904, 905, 906 and system memory 909 (typically limited by available space) including, byway of example and not limitation, operating systems, application programs, data files, directory structures, computer-executable instructions, and the like.

Output components or devices, such as display device 902, may be coupled to computing device 901, typically via an interface such as a display adapter 911. Output device 902 may be a liquid crystal display ("LCD"). Other example output devices may include printers, audio outputs, voice outputs, cathode ray tube ("CRT") displays, tactile devices or other sensory output mechanisms, or the like. Output devices may enable computing device 901 to interact with human operators or other machines, systems, computing environments, or the like. A user may interface with computing environment 900 via any number of different I/O devices 903 such as a touch pad, buttons, keyboard, mouse, joystick, game pad, data port, and the like. These and other I/O devices may be coupled to processor 907 via I/O interfaces 912 which may be coupled to system bus 908, and/or may be coupled by other interfaces and bus structures, such as a parallel port, game port, universal serial bus ("USB"), fire wire, infrared ("IR") port, and the like.

Computing device 901 may operate in a networked environment via communications connections to one or more remote computing devices through one or more cellular networks, wireless networks, local area networks ("LAN"), wide area networks ("WAN"), storage area networks ("SAN"), the internet, radio links, optical links and the like. Computing device 901 may be coupled to a network via network adapter 91 or the like, or, alternatively, via a modem, digital subscriber line ("DSL") link, integrated services digital network ("ISDN") link, Internet link, wireless link, or the like.

Communications connection 914, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. Byway of example, and not limitation, communications media may include wired media, such as a wired network or direct-wired connection or the like, and wireless media, such as acoustic, radio frequency, infrared, or other wireless communications mechanisms.

Power source 990, such as a battery or a power supply, typically provides power for portions or all of computing environment 900. In the case of the computing environment 900 being a mobile device or portable device or the like, power source 990 may be a battery. Alternatively, in the case computing environment 900 is a desktop computer or server or the like, power source 990 may be a power supply designed to connect to an alternating current ("AC") source, such as via a wall outlet.

Some mobile devices may not include many of the components described in connection with FIG. 9. For example, an electronic badge may be comprised of a coil of wire along with a simple processing unit 907 or the like, the coil configured to act as power source 990 when in proximity to a card reader device or the like. Such a coil may also be configure to act as an antenna coupled to the processing unit 907 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 902, I/O device 903, or many of the other components described in connection with FIG. 9. Other mobile devices that may not include many of the components described in connection with FIG. 9, byway of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part, or ail of a software application or data and may execute any computer-executable instructions. Alternatively, the local computer may download pieces of the software or data as needed, or process the software in a distributed manner by executing some of the instructions at, the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device that includes at least one processor, memory, and a communications component, the method comprising:
    receiving, by the computing device via the communications component, a message that comprises a set of variables configured for use in detecting a message race condition in a communications session between the computing device and a remote computing device, the set of variables including:
        a nonce state variable that comprises a value that identifies the communications session according to the computing device,
        a counter state variable that comprises a value that indicates a last message sent by the computing device to the remote computing device,
        a remote nonce state variable that comprises a value that identifies the communications session according to the remote computing device as known by the computing device, and
        a remote counter state variable that comprises a value that indicates a last valid message received by the computing device from the remote computing device.

2. The method of claim 1 where the value of the nonce state variable uniquely identifies the communications session.

3. The method of claim 1 where the value of the counter state variable is a monotonically increasing value that corresponds to the last message sent by the computing device to the remote computing device.

4. The method of claim 1 where the value of the remote nonce state variable is initialized to a value different than that of a previous nonce.

5. The method of claim 1 where the value of the remote counter state variable is initialized to an initialization value.

6. The method of claim 1 where the received message comprises a header that includes the nonce state variable, the counter state variable, the remote nonce state variable, and the remote counter state variable.

7. The method of claim 1 where the last valid message received by the computing device from the remote computing device comprises a header that includes another nonce state variable, another counter state variable, another remote nonce state variable, and another the remote counter state variable.

8. A computing device comprising:
    at least one processor;
    memory coupled to the at least one processor;
    a communications component implemented at least in part by the at least one processor and configured to receive a message into the memory that comprises a set of variables configured for use in detecting a message race condition in a communications session between the computing device and a remote computing device, the set of variables including:
        a nonce state variable comprises a value that identifies a communications session according to the computing device,
        a counter state variable comprises a value that indicates a last message sent by the computing device to a remote computing device,
        a remote nonce state variable comprises a value that identifies a current communications session according to the remote computing device as known by the computing device, and
        a remote counter state variable comprises a value that indicates a last valid message received by the computing device from the remote computing device.

9. The computing device of claim 8 where the value of the nonce state variable uniquely identifies the communications session.

10. The computing device of claim 8 where the value of the counter state variable is a monotonically increasing value that corresponds to the last message sent by the computing device to the remote computing device.

11. The computing device of claim 8 where the value of the remote nonce state variable is initialized to a value different than that of a previous nonce.

12. The computing device of claim 8 where the value of the remote counter state variable is initialized to an initialization value.

13. The computing device of claim 8 where the received message comprises a header that includes the nonce state variable, the counter state variable, the remote nonce state variable, and the remote counter state variable.

14. The computing device of claim 8 where the last valid message received by the computing device from the remote computing device comprises a header that includes another nonce state variable, another counter state variable, another remote nonce state variable, and another the remote counter state variable.

15. At least one computer storage device comprising:
    memory that comprises computer-executable instructions that, based on execution by a computing device that includes a communications component, configure the computing device to:
        receive a message that comprises a set of variables configured for use in detecting a message race condition in a communications session between the computing device and a remote computing device, the set of variables including:
            a nonce state variable comprises a value that identifies a communications session according to the computing device,
            a counter state variable comprises a value that indicates a last message sent by the computing device to a remote computing device,
            a remote nonce state variable comprises a value that identifies a current communications session according to the remote computing device as known by the computing device, and
            a remote counter state variable comprises a value that indicates a last valid message received by the computing device from the remote computing device.

16. The at least one computer storage device of claim 15 where the value of the nonce state variable uniquely identifies the communications session.

17. The at least one computer storage device of claim 15 where the value of the counter state variable is a monotonically increasing value that corresponds to the last message sent by the computing device to the remote computing device.

18. The at least one computer storage device of claim 15 where the value of the remote nonce state variable is initialized to a value different than that of a previous nonce, or where the value of the remote counter state variable is initialized to an initialization value.

19. The at least one computer storage device of claim 15 where the received message comprises a header that includes the nonce state variable, the counter state variable, the remote nonce state variable, and the remote counter state variable.

20. The at least one computer storage device of claim 15 where the last valid message received by the computing device from the remote computing device comprises a header that includes another nonce state variable, another counter state variable, another remote nonce state variable, and another the remote counter state variable.

* * * * *